(12) United States Patent
Kucherov et al.

(10) Patent No.: US 10,929,050 B2
(45) Date of Patent: Feb. 23, 2021

(54) STORAGE SYSTEM WITH DEDUPLICATION-AWARE REPLICATION IMPLEMENTED USING A STANDARD STORAGE COMMAND PROTOCOL

(71) Applicant: EMC IP Holding Company LLC, Hopkinton, MA (US)

(72) Inventors: Anton Kucherov, Dudley, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 98 days.

(21) Appl. No.: 16/396,897

(22) Filed: Apr. 29, 2019

(65) Prior Publication Data

US 2020/0341641 A1    Oct. 29, 2020

(51) Int. Cl.
| | |
|---|---|
| *G06F 3/06* | (2006.01) |
| *G06F 12/10* | (2016.01) |
| *G06F 13/42* | (2006.01) |

(52) U.S. Cl.
CPC ............. *G06F 3/065* (2013.01); *G06F 3/067* (2013.01); *G06F 3/0608* (2013.01);
(Continued)

(58) Field of Classification Search
CPC ...... G06F 3/065; G06F 3/0608; G06F 3/0641; G06F 3/067; G06F 12/10; G06F 13/4221;
(Continued)

(56) References Cited

U.S. PATENT DOCUMENTS

| | | |
|---|---|---|
| 7,444,464 B2 | 10/2008 | Urmston et al. |
| 8,095,726 B1 | 1/2012 | O'Connell et al. |
| (Continued) | | |

FOREIGN PATENT DOCUMENTS

WO        2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — William E. Baughman
(74) *Attorney, Agent, or Firm* — Ryan, Mason & Lewis, LLP

(57) ABSTRACT

An apparatus obtains a set of content-based signatures for respective data pages of at least a portion of at least one storage volume replicated from a source storage system to a target storage system, issues a write for the set of content-based signatures to the target storage system, and reads from a designated location in the target storage system information indicating for each of the content-based signatures whether or not the corresponding data page is present in the target storage system. For one or more data pages not present in the target storage system, the apparatus writes the one or more data pages to respective logical addresses of the replicated storage volume in the target storage system. The issuing of a write, the reading from the designated location, and the writing of the one or more data pages are illustratively performed utilizing respective commands of a standard storage command protocol.

20 Claims, 10 Drawing Sheets

(52) U.S. Cl.
CPC ............ *G06F 3/0641* (2013.01); *G06F 12/10* (2013.01); *G06F 13/4221* (2013.01); *G06F 2212/1044* (2013.01); *G06F 2212/657* (2013.01); *G06F 2213/0036* (2013.01)

(58) Field of Classification Search
CPC ....... G06F 2212/1044; G06F 2212/657; G06F 2213/0036
USPC ...................................................... 711/162
See application file for complete search history.

(56) References Cited

U.S. PATENT DOCUMENTS

| | | | |
|---|---|---|---|
| 8,214,612 | B1 | 7/2012 | Natanzon |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2011/0167221 | A1* | 7/2011 | Pangal ............... G06F 3/065 711/117 |
| 2012/0017060 | A1* | 1/2012 | Kapanipathi ........... G06F 3/065 711/162 |
| 2012/0084518 | A1* | 4/2012 | Vijayan ............... G06F 11/1453 711/162 |
| 2012/0221525 | A1* | 8/2012 | Gold .................. G06F 11/1458 707/644 |
| 2013/0325824 | A1 | 12/2013 | Shoens |
| 2014/0122818 | A1* | 5/2014 | Hayasaka ............ G06F 3/0641 711/162 |
| 2014/0181016 | A1 | 6/2014 | Whitehead et al. |
| 2016/0077926 | A1* | 3/2016 | Mutalik .............. G06F 11/1453 711/162 |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |
| 2017/0269847 | A1* | 9/2017 | Liang .................. G06F 11/1453 |
| 2019/0026043 | A1* | 1/2019 | Chen .................. H04L 67/1097 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

U.S. Appl. No. 16/253,793 filed in the name of Yuval Harduf et al. on Jan. 22, 2019 and entitled "Storage System with Data Consistency Checking in Synchronous Replication Using Active Snapshot Set."

* cited by examiner

ADDRESS-TO-HASH (A2H) TABLE

| LOGICAL ADDRESS 1 | HASH HANDLE OF DATA PAGE | OTHER FIELDS |
| LOGICAL ADDRESS 2 | HASH HANDLE OF DATA PAGE | OTHER FIELDS |
| ... | ... | ... |
| LOGICAL ADDRESS M | HASH HANDLE OF DATA PAGE | OTHER FIELDS |

TABLE KEY

HASH METADATA (HMD) TABLE (404)

| HASH HANDLE 1 | REF COUNT 1 | PHYSICAL OFFSET OF DATA PAGE |
| HASH HANDLE 2 | REF COUNT 2 | PHYSICAL OFFSET OF DATA PAGE |
| ... | | |
| HASH HANDLE H | REF COUNT H | PHYSICAL OFFSET OF DATA PAGE |

TABLE KEY: {HASH HANDLE}

PHYSICAL LAYER BASED (PLB) TABLE — 406

| | HASH DIGEST OF DATA PAGE | OTHER FIELDS |
|---|---|---|
| PHYSICAL OFFSET 1 | HASH DIGEST OF DATA PAGE | OTHER FIELDS |
| PHYSICAL OFFSET 2 | HASH DIGEST OF DATA PAGE | OTHER FIELDS |
| ... | | |
| PHYSICAL OFFSET P | HASH DIGEST OF DATA PAGE | OTHER FIELDS |

TABLE KEY

FIG. 4D

STORAGE SYSTEM WITH DEDUPLICATION-AWARE REPLICATION IMPLEMENTED USING A STANDARD STORAGE COMMAND PROTOCOL

FIELD

The field relates generally to information processing systems, and more particularly to storage in information processing systems.

BACKGROUND

Many information processing systems are configured to replicate data from one storage system to another storage system, possibly at different physical sites. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication at certain times and synchronous replication at other times. For example, asynchronous replication may be configured to periodically transfer data in multiple cycles from a source site to a target site, while synchronous replication may be configured to mirror host writes from the source site to the target site as the writes are made at the source site. Storage systems participating in a replication process can therefore each be configured to support both asynchronous and synchronous replication modes.

Conventional approaches to data replication can be problematic under certain conditions. For example, some storage systems are configured to perform deduplication of replicated data pages, but those storage systems often require the utilization of proprietary protocols for messaging between source and target. It would be highly desirable if deduplication could be performed in conjunction with replication but without the need for utilization of a proprietary protocol between source and target.

SUMMARY

Illustrative embodiments include storage systems with what is referred to herein as "deduplication-aware replication functionality" that can be implemented using standard storage command protocols. For example, some of these embodiments advantageously avoid the need for utilization of proprietary protocols between source and target storage systems, and therefore allow such replication to be carried out in a much wider variety of storage systems than would otherwise be possible. Moreover, deduplication-aware replication in illustrative embodiments disclosed herein is bandwidth efficient and can improve performance while facilitating the achievement of a desired recover point objective (RPO).

The source and target storage systems are illustratively implemented as respective content addressable storage systems, although other types of storage systems can be used in other embodiments.

In one embodiment, an apparatus comprises at least one processing device comprising a processor coupled to a memory. The processing device is configured to obtain a set of content-based signatures for respective data pages of at least a portion of at least one storage volume replicated from a source storage system to a target storage system, to issue a write for the set of content-based signatures to the target storage system, and to read from a designated location in the target storage system information indicating for each of the content-based signatures whether or not the corresponding data page is present in the target storage system. For one or more data pages not present in the target storage system, the apparatus writes the one or more data pages to respective logical addresses of the replicated storage volume in the target storage system.

In some embodiments, issuing a write for the set of content-based signatures to the target storage system illustrative comprises issuing a write to a designated content-based signature scan address, such that the write to that address is interpreted by the target storage system as not comprising an actual write command but instead comprising a command to scan for content-based signatures.

For example, in embodiments in which the set of content-based signatures comprises a set of hash handles, the write to the designated content-based signature scan address illustratively comprises a write to a designated "hash handles" address. As indicated above, such a write is interpreted by the target storage system as not comprising an actual write command, but instead comprising a command to scan for hash handles. Similar writes can be issued for sets of hash digests in other embodiments, in order to cause the target storage system to initiate a scan for hash digests.

The issuing of a write to the target storage system, reading from the designated location, and writing the one or more data pages to respective logical addresses are illustratively performed utilizing respective commands of a standard storage command protocol, such as an iSCSI protocol or other type of SCSI protocol, or an NVMeOF protocol. The deduplication-aware replication functionality in such embodiments leverages the standard storage command protocol to carry replication information between the source and target storage systems without the need for a proprietary protocol.

The processing device in some embodiments is part of at least one of the source and target storage systems, and more particularly implements a storage controller of at least one of the source and target storage systems, although numerous alternative implementations are possible. For example, in other embodiments the processing device is implemented at least in part in a host device configured to communicate over a network with the source and target storage systems. Again, these are only examples, and alternative implementations are possible.

The storage volume illustratively comprises at least one logical storage volume comprising at least a portion of a physical storage space of one or more storage devices. The term "storage volume" as used herein is therefore intended to be broadly construed, so as to encompass a set of one or more logical storage volumes.

The storage volume in some embodiments is part of a consistency group subject to an ongoing asynchronous or synchronous replication process. Accordingly, the deduplication-aware replication is illustratively performed in conjunction with replication of the consistency group from the source storage system to the target storage system.

In some embodiments, the information read from the designated location and indicating for each of the content-based signatures whether or not the corresponding data page is present in the target storage system comprises at least one bitmap.

The content-based signatures in some embodiments comprise respective hash digests of respective data pages of the replicated storage volume, with a given one of the hash digests being generated by applying a secure hashing algorithm to content of a corresponding one of the data pages of the replicated storage volume.

As indicated previously, in other embodiments, the content-based signatures comprise respective hash handles of respective ones of the data pages.

For example, in an embodiment of this type, for any of the data pages which are determined based on the hash handles to be present in the target storage system, the processing device is further configured to issue a write for hash digests and respective logical addresses of those data pages in the replicated storage volume to the target storage system, and to read from another designated location in the target storage system information indicating for each of the hash digests whether or not a matching data page is present in the target storage system.

The target storage system in such an embodiment adjusts logical address mapping information and increments a reference count for each of one or more of the matching data pages, and the source storage system writes one or more non-matching data pages to respective logical addresses of the replicated storage volume in the target storage system.

For at least one of the one or more data pages not present in the target storage system, the source storage system writes the data page to a corresponding logical address in a compressed format, and the data page in the compressed format is decompressed by the target storage system prior to its storage in the corresponding logical address. Some embodiments are therefore configured to support not only deduplication-aware replication, but also compression of any non-deduplicated data pages that need to be written from the source storage system to the target storage system as part of the replication process.

The source storage system in some embodiments comprises a clustered implementation of a content addressable storage system having a distributed storage controller. The content addressable storage system in arrangements of this type is illustratively configured to utilize non-volatile memory storage devices, such as flash-based storage devices. For example, the storage devices of the source storage system in such embodiments can be configured to collectively provide an all-flash storage array. The target storage system can similarly comprise an all-flash storage array, or another type of content addressable storage system. Numerous other storage system arrangements are possible in other embodiments. Content addressable storage is therefore not required.

These and other illustrative embodiments include, without limitation, apparatus, systems, methods and processor-readable storage media.

BRIEF DESCRIPTION OF THE DRAWINGS

FIGS. 4A, 4B, 4C and 4D show examples of logical layer and physical layer mapping tables utilized in deduplication-aware replication in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
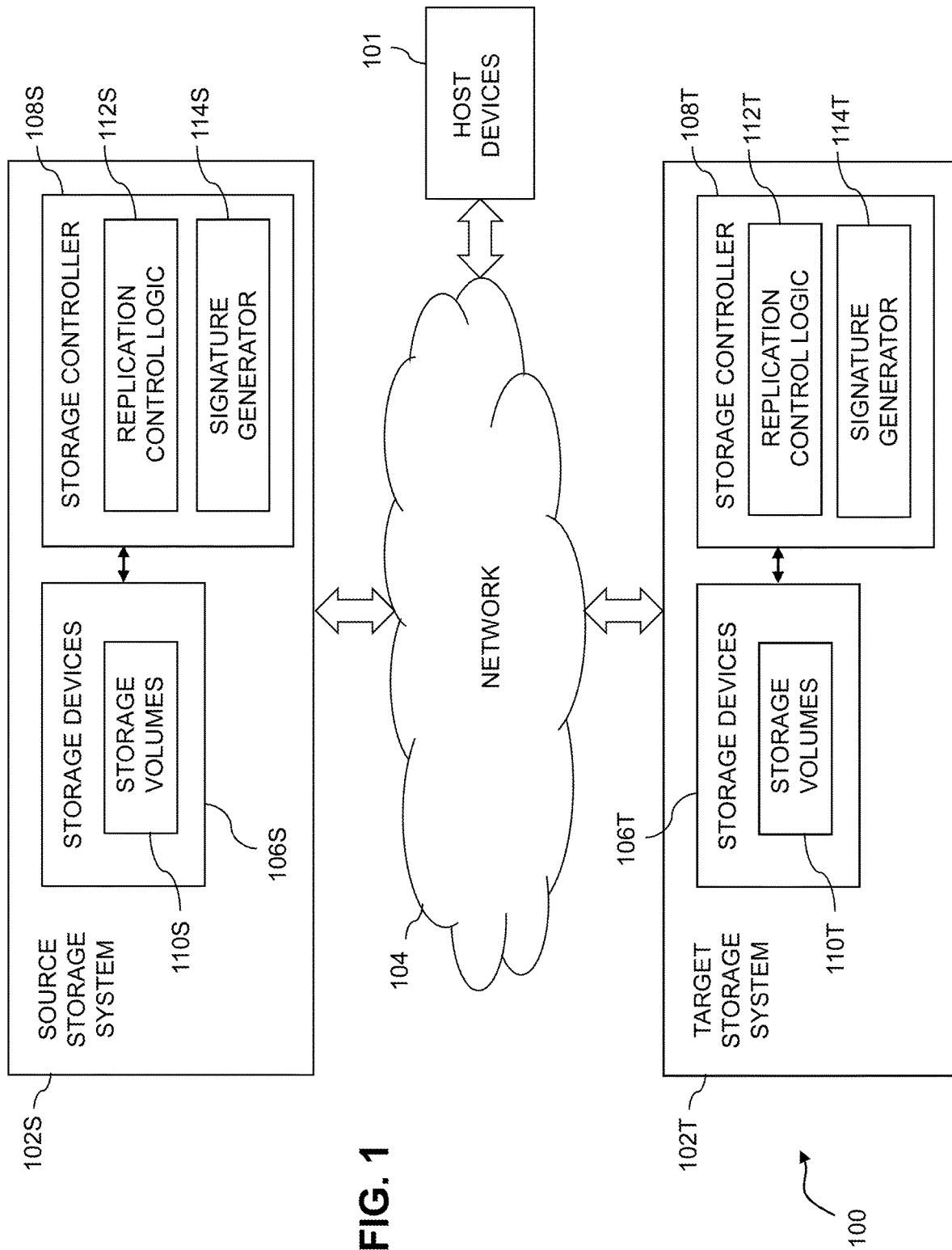
FIG. 1 is a block diagram of an information processing system comprising source and target storage systems configured with deduplication-aware replication functionality in an illustrative embodiment.

FIG. 1 shows an information processing system 100 configured in accordance with an illustrative embodiment. The information processing system 100 comprises a plurality of host devices 101, a source storage system 102S and a target storage system 102T, all of which are configured to communicate with one another over a network 104. The source and target storage systems 102 are more particularly configured in this embodiment to participate in an asynchronous or synchronous replication process in which one or more storage volumes are asynchronously or synchronously replicated from the source storage system 102S to the target storage system 102T, possibly with involvement of at least one of the host devices 101. The one or more storage volumes that are asynchronously or synchronously replicated from the source storage system 102S to the target storage system 102T are illustratively part of a designated consistency group.

Each of the storage systems 102 is illustratively associated with a corresponding set of one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices. Such applications illustratively generate input-output (IO) operations that are processed by a corresponding one of the storage systems 102. The term "input-output" as used herein refers to at least one of input and output. For example, IO operations may comprise write requests and/or read requests directed to stored data of a given one of the storage systems 102.

The storage systems 102 illustratively comprise respective processing devices of one or more processing platforms. For example, the storage systems 102 can each comprise one or more processing devices each having a processor and a memory, possibly implementing virtual machines and/or containers, although numerous other configurations are possible.

The storage systems 102 can additionally or alternatively be part of cloud infrastructure such as an Amazon Web Services (AWS) system. Other examples of cloud-based systems that can be used to provide at least portions of the storage systems 102 include Google Cloud Platform (GCP) and Microsoft Azure.

The storage systems 102 may be implemented on a common processing platform, or on separate processing platforms.

The host devices 101 are illustratively configured to write data to and read data from the storage systems 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The source storage system 102S comprises a plurality of storage devices 106S and an associated storage controller 108S. The storage devices 106S store storage volumes 110S. The storage volumes 110S illustratively comprise respective logical units (LUNs) or other types of logical storage volumes.

Similarly, the target storage system 102T comprises a plurality of storage devices 106T and an associated storage controller 108T. The storage devices 106T store storage volumes 110T, at least a portion of which represent respective LUNs or other types of logical storage volumes that are replicated from the source storage system 102S to the target storage system 102T in accordance with an asynchronous or synchronous replication process.

The storage devices 106 of the storage systems 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, at least one of the storage systems 102 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems 102 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 102 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, communications between certain components of system 100, such as the host devices 101 and the storage systems 102, illustratively comprise Small Computer System Interface (SCSI) commands. Other types of SCSI or non-SCSI commands may be used in other embodiments, including commands that are part of a standard command set, or custom commands such as a "vendor unique command" or VU command that is not part of a standard command set.

Although in some embodiments certain commands used for communications between the host devices 101 and the storage systems 102 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage command protocols of this type that may be utilized in illustrative embodiments disclosed herein include NVMe over Fabric, also referred to as NVMeoF.

In some embodiments, a deduplication-aware replication process is implemented using communications between the storage systems 102 that leverage the above-noted SCSI or NVMeoF protocols, or other standard storage command protocols, in order to allow the storage systems 102 to carry out deduplication-aware replication without the need for a proprietary protocol to carry replication messages between those storage systems.

The term "command" as used herein is intended to be broadly construed, so as to encompass, for example, one or more individual messages or other types of communications in a SCSI protocol, NVMeoF protocol or other storage command protocol. Accordingly, a given command as that term is broadly used herein can comprise a composite command that includes a combination of multiple individual commands. Numerous other types and arrangements of commands can be used in other embodiments.

The storage controller 108S of source storage system 102S in the FIG. 1 embodiment includes replication control logic 112S and a signature generator 114S.

Similarly, the storage controller 108T of target storage system 102T includes replication control logic 112T and a signature generator 114T.

The instances of replication control logic 112S and 112T are collectively referred to herein as replication logic 112. Such replication control logic instances are also referred to herein as individually or collectively comprising at least a portion of a "replication engine" of the system 100.

The replication control logic 112 of the storage systems 102 controls performance of the asynchronous or synchronous replication process carried out between those storage systems, which as noted above in some embodiments further involves at least one of the host devices 101. The data replicated from the source storage system 102S to the target storage system 102T can include all of the data stored in the source storage system 102S, or only certain designated subsets of the data stored in the source storage system 102S, such as particular designated sets of LUNs or other logical storage volumes. Different replication processes of different types can be implemented for different parts of the stored data.

A given storage volume designated for replication from the source storage system 102S to the target storage system 102T illustratively comprises a set of one or more LUNs or other instances of the storage volumes 110S of the source storage system 102S. Each such LUN or other storage volume illustratively comprises at least a portion of a physical storage space of one or more of the storage devices 106S. The corresponding replicated LUN or other storage volume of the storage volumes 110T of the target storage system 102T illustratively comprises at least a portion of a physical storage space of one or more of the storage devices 106T.

Figure 2:
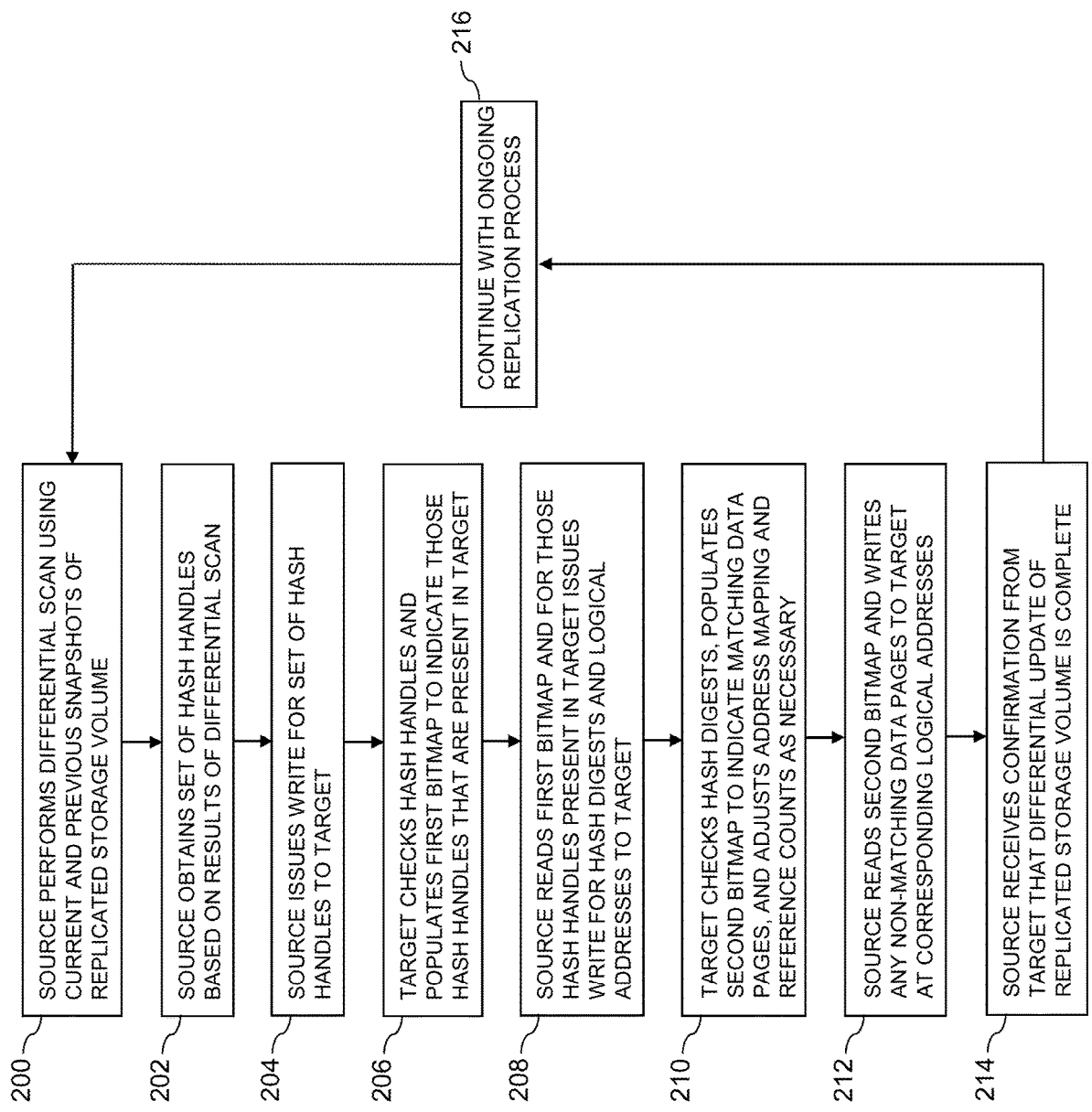
FIG. 2 is a flow diagram of a process for deduplication-aware replication in an illustrative embodiment.

The replication control logic 112 of the storage systems 102 in some embodiments is configured to control the performance of a deduplication-aware replication process using standard storage command protocols, for example, in the manner illustrated in the flow diagram of FIG. 2. At least one of the host devices 101 in some embodiments can also include one or more instances of replication control logic and possibly also one or more signature generators.

The storage controllers 108 of the storage systems 102 should also be understood to include additional modules and other components typically found in conventional implementations of storage controllers and storage systems, although such additional modules and other components are omitted from the figure for clarity and simplicity of illustration.

It will be assumed for the following description of the FIG. 1 embodiment that there is an ongoing asynchronous or synchronous replication process being carried out between the source storage system 102S and the target storage system 102T in the system 100, utilizing their respective instances of replication control logic 112S and 112T.

An exemplary asynchronous replication process more particularly comprises a cycle-based asynchronous replication process in which a consistency group comprising one or more storage volumes is replicated from the source storage system 102S to the target storage system 102T over a plurality of asynchronous replication cycles.

An exemplary synchronous replication process more particularly comprises a synchronous replication process in which host writes to a consistency group comprising one or more storage volumes are mirrored from the source storage system 102S to the target storage system 102T as the host writes are made at the source storage system 102S.

Other types of replication arrangements can be used in other embodiments. For example, the storage systems may be configurable to operate in both asynchronous and synchronous replication modes, with transitions between the modes controlled by their respective instances of replication control logic 112S and 112T.

Other examples of replication processes that can be used in illustrative embodiments include active-active replication, in which one of the storage systems operates as a "leader" relative to another one of the storage systems operating as a "follower" in implementing consistent synchronous writes to both storage systems. Such active-active replication is considered a type of synchronous replication as that term is broadly used herein.

The system 100 is illustratively configured to provide what is referred to herein as "deduplication-aware replication" between the source storage system 102S and the target storage system 102T. These and other operations related to performance of deduplication-aware replication functionality as disclosed herein are illustratively implemented at least in part by or otherwise under the control of the source and target instances of replication control logic 112S and 112T.

In accordance with the deduplication-aware replication functionality, the source storage system 102S is configured to obtain a set of content-based signatures for respective data pages of at least a portion of at least one storage volume replicated from the source storage system 102S to the target storage system 102T, to issue a write for the set of content-based signatures to the target storage system 102T, and to read from a designated location in the target storage system 102T information indicating for each of the content-based signatures whether or not the corresponding data page is present in the target storage system 102T.

For one or more data pages not present in the target storage system 102T, the source storage system 102S write the one or more data pages to respective logical addresses of the replicated storage volume in the target storage system.

In some embodiments, the source storage system 102S issuing a write for the set of content-based signatures to the target storage system 102T comprises the source storage system 102S issuing a write to a designated content-based signature scan address such that the write to that address is interpreted by the target storage system 102T as not comprising an actual write command but instead comprising a command directing the target storage system 102T to scan for content-based signatures.

The designated content-based signature scan address can comprise any type of address information, and in some embodiments need not comprise an actual address within the target storage system 102T, but instead an address that the target storage system 102T recognizes as being associated with a command to initiate a content-based signature scan against a set of content-based signatures supplied by the source storage system 102S. Other types of non-address information can be incorporated into the write issued by the source storage system 102S in order to trigger the target storage system 102T to perform the content-based signature scan in other embodiments.

The replicated storage volume illustratively comprises at least one logical storage volume that is part of a consistency group subject to the ongoing replication process carried out between the source and target storage systems 102.

The term "storage volume" as used herein is intended to be broadly construed, and should not be viewed as being limited to any particular format or configuration. The term "consistency group" as used herein is also intended to be broadly construed, and may comprise one or more other storage volumes.

In some embodiments, obtaining the set of content-based signatures comprises generating a current snapshot of the replicated storage volume, performing a differential scan of the current snapshot relative to a previous snapshot of the replicated storage volume, and obtaining the set of content-based signatures based at least in part on results of the differential scan. An example of a differential scan of this type performed in conjunction with an ongoing asynchronous replication process will be described below in conjunction with FIG. 3. Other techniques can be used to obtain the set of content-based signatures in other embodiments.

The above-noted operations of issuing a write to target storage system 102T, reading from the designated location in the target storage system 102T, and writing the one or more data pages to respective logical addresses are performed utilizing respective commands of a standard storage command protocol.

For example, the standard storage command protocol in some embodiments comprises a SCSI protocol, such as an Internet SCSI (iSCSI) protocol or Serial-Attached SCSI (SAS) protocol. As indicated previously, other types of standard storage command protocols can be used in other embodiments, such as the NVMeoF protocol.

The information read by the source storage system 102S from the designated location in the target storage system 102T, which indicated for each of the content-based signatures whether or not the corresponding data page is present in the target storage system 102T, illustratively comprises at least one bitmap. Other types of data structures can be used in addition to or in place of bitmaps in other embodiments.

The content-based signatures in some embodiments comprise respective hash digests of respective data pages of the replicated storage volume. A given one of the hash digests is generated in illustrative embodiments by applying a secure hashing algorithm to content of a corresponding one of the data pages of the replicated storage volume.

For example, a given hash digest can be generated by application of a hash function such as the well-known Secure Hashing Algorithm 1 (SHA1) to the content of its corresponding data page. Other types of secure hashing algorithms, such as SHA2 or SHA256, or more generally other hash functions, can be used in generating content-based signatures herein.

A given hash digest in illustrative embodiments is unique to the particular content of the page from which it is generated, such that two pages with exactly the same content will have the same hash digest, while two pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

In some embodiments in which the content-based signatures comprise respective hash handles of respective ones of the data pages, the source storage system 102S is further configured, for any of the data pages which are determined based on the hash handles to be present in the target storage system 102T, to issue a write for hash digests and respective logical addresses of those data pages in the replicated storage volume to the target storage system 102T, and to read from another designated location in the target storage system 102T information indicating for each of the hash digests whether or not a matching data page is present in the target storage system 102T. The target storage system 103T illustratively adjusts logical address mapping information and increments a reference count for each of one or more of the matching data pages. The source storage system 102S writes one or more non-matching data pages to respective logical addresses of the replicated storage volume in the target storage system 102T.

Illustrative embodiments can also be configured to compression functionality in addition to deduplication functionality.

For example, for at least one of the one or more data pages not present in the target storage system 102T, the source storage system 102S writes the data page to a corresponding logical address in a compressed format. The target storage system 102T in conjunction with receiving such a write from the source storage system 102S for the data page in compressed format proceeds to decompresses the data page prior to storing the decompressed data page at the corresponding logical address.

In some embodiments, each of the storage systems 102 is configured in substantially the same manner, so as to support selective implementation of either one of source or target portions of the deduplication-aware replication functionality.

As indicated above, some embodiments utilize logical address mapping information as well as other types of metadata in implementing content addressable storage functionality. The logical address mapping information in some embodiments comprises at least a portion of one or more logical layer mapping tables that map logical addresses of respective ones of the data pages of the storage volume to corresponding content-based signatures of the respective data pages. Examples of logical layer mapping tables and other types of metadata structures maintained by the storage controllers 108 of the storage systems 102 will be described below in conjunction with FIGS. 4A through 4D. It is to be appreciated that these particular metadata structures are only examples, and can be varied in other embodiments.

The deduplication-aware replication functionality implemented in system 100 can be implemented using standard storage command protocols. For example, some of these embodiments advantageously avoid the need for utilization of proprietary protocols between the source and target storage systems 102, and therefore allow such replication to be carried out in a much wider variety of storage systems than would otherwise be possible.

In addition, the deduplication-aware replication functionality in some embodiments can be configured to operate in conjunction with an ongoing asynchronous or synchronous replication process without unduly lengthening any replication cycle or undermining the ability to meet a desired RPO. Moreover, such arrangements avoid wasting scarce network bandwidth resources in transferring over the network 104 any data pages that are already resident in the target storage system 102T.

A more particular example of the deduplication-aware replication functionality described above will now be presented. In this example, the replication control logic instances 112S and 112T are assumed to cooperate to implement the deduplication-aware replication functionality, and collectively provide a replication engine of system 100 that can replicate one or more storage volumes from one of the storage systems 102 to the other one of the storage systems, and vice-versa. Accordingly, the designation of one of the storage systems 102 as the "source" and the other as the "target" can vary over time.

The present example of deduplication-aware replication functionality in an illustrative embodiment comprises an algorithm that includes the following steps:

1. The source performs a differential scan of a current snapshot of the replicated storage volume relative to a previous snapshot of the replicated storage volume.

2. The source obtains a set of hash handles using the results of the differential scan.

3. The source issues a write for the set of hash handles to the target. The source does not actually write the set of hash handles to the target, but instead sends the set of hash handles with a write directed to a designated "hash handles" address. The target recognizes a write to that address as not being an actual write command, but instead being a command from the source to perform a hash handle scan in the target against the set of hash handles provided by the source. Although the write is issued by the source using a standard storage command protocol, the source is essentially "piggybacking" its scan command on that protocol and not issuing an actual write command.

4. The target interprets the write issued by the source and initiates the hash handle scan. The target populates a first bitmap at a designated location (e.g., a first "matching results" address) to indicate hash handles that are present in the target. The first bitmap in some embodiments comprises a plurality of bits corresponding to respective ones of the hash handles, and the target sets a given one of the bits of the first bitmap to a particular value, illustratively a logic "1" value, to indicate success in matching the corresponding hash handle. The write does not return until the scan is complete.

5. The source reads the first bitmap from the designated location and uses the first bitmap to determine which of the hash handles of the above-noted set of hash handles are also present in the target.

6. The source issues a write for hash digests and logical addresses to a designated "hash digests" address. Like the write issued by the source in step 3, this write is also recognized by the target as requiring special processing rather than being an actual write command.

7. The target checks the hash digests provided by the source against the hash digests for the corresponding data pages in the target. If a given one of the hash digests matches, the target sets a corresponding bit in a second bitmap to a success value and adjusts address mapping and reference counts as necessary. The second bitmap therefore illustratively comprises a plurality of bits corresponding to respective ones of the hash digests, and the target sets a given one of the bits to a particular value, illustratively a logic "1" value, to indicate success in matching the corresponding hash digest.

8. The source reads the second bitmap, illustratively from a different designated location (e.g., a second "matching results" address) than that used for the first bitmap.

9. The source sends writes of data pages for any logical addresses that were not deduplicated. The data pages can be sent in compressed form and then decompressed by the target prior to storage.

10. The target writes the data pages and when indications of success have been returned for all data pages of the replication storage volume, the current replication cycle is considered complete.

In some embodiments, the above-listed operations are applied against a replicated storage volume that is protected from any exposure to user IO requests and their corresponding SCSI or NVMeoF commands. At the completion of the current replication cycle, the replicated storage volume can once again be exposed to user IO requests and their corresponding SCSI or NVMeoF commands.

These operations are examples only, and can be varied in other embodiments. For example, in embodiments in which the storage systems support only hash digests but not hash handles, the operations can be adjusted in a straightforward manner to eliminate the portions that rely upon hash handles.

In the foregoing example process, the deduplication-aware replication functionality illustratively leverages standard storage command protocols such as iSCSI or NVMeOF to allow the source storage system 102S to replicate a storage volume to the target storage system 102T. Such an approach advantageously avoids the need for a proprietary protocol for communication between the storage systems 102.

The process is applicable to various types of replication, including asynchronous replication, synchronous replication and active-active replication, and involves at least one replicated storage volume. In the case of active-active replication, the replicated storage volume may be set up as a dummy storage volume on the target, so as to avoid exposure to user IOs during an active cycle of the replication process, with the user IOs being forwarded to the actual storage volume on the target.

The above-described operations carried out in conjunction with a process for deduplication-aware replication involving the storage systems 102 are illustratively performed at least in part under the control of the replication engine comprising the multiple instances of replication control logic 112. As is apparent from the foregoing description, such operations utilize hash digests, hash handles or other types of content-based signatures illustratively generated by one or more of the signature generators 114.

The storage systems 102 in the FIG. 1 embodiment are assumed to be implemented using at least one processing platform each comprising one or more processing devices each having a processor coupled to a memory. Such processing devices can illustratively include particular arrangements of compute, storage and network resources.

The storage systems 102 may be implemented on respective distinct processing platforms, although numerous other arrangements are possible. At least portions of their associated host devices may be implemented on the same processing platforms as the storage systems 102 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage systems 102 to reside in different data centers. Numerous other distributed implementations of the storage systems 102 and their respective associated sets of host devices are possible.

Additional examples of processing platforms utilized to implement storage systems and possibly their associated host devices in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as host devices 101, storage systems 102, network 104, storage devices 106, storage controllers 108 and storage volumes 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, functionality for deduplication-aware replication can be implemented in one or more host devices, or partially in a host device and partially in a storage system. Accordingly, illustrative embodiments are not limited to arrangements in which all such functionality is implemented in source and target storage systems or a host device, and therefore encompass various hybrid arrangements in which the functionality is distributed over one or more storage systems and one or more associated host devices, each comprising one or more processing devices.

As another example, it is possible in some embodiments that the source storage system and the target storage system can comprise the same storage system. In such an arrangement, an asynchronous or synchronous replication process is illustratively implemented to replicate data from one portion of the storage system to another portion of the storage system. The terms "source storage system" and "target storage system" as used herein are therefore intended to be broadly construed so as to encompass such possibilities.

The operation of the information processing system 100 will now be described in further detail with reference to the flow diagram of the illustrative embodiment of FIG. 2, which implements a deduplication-aware replication process. The steps of the process illustratively involve interactions between a source storage system and a target storage system, referred to as respective "source" and "target" in these figures, illustratively utilizing replication control logic instances and signature generators of storage controllers of the source and target. It is possible in other embodiments that at least one of the storage systems does not include replication control logic and a signature generator, and in such embodiments these components are instead implemented in one or more host devices. The respective roles of a given pair of storage systems as "source" and "target" can be reversed in other embodiments. For example, such roles can vary over time depending on operating conditions.

The deduplication-aware replication process as illustrated in FIG. 2 includes steps 200 through 216, and is suitable for use in system 100 but is more generally applicable to a wide variety of other types of information processing systems in which data is replicated between multiple storage systems.

In step 200, the source performs a differential scan using current and previous snapshots of a replicated storage volume. This embodiment assumes there is an ongoing replication of at least one storage volume from source to target. The ongoing replication can comprise asynchronous or synchronous replication. The one or more storage volumes subject to ongoing replication are illustratively part of a consistency group that is subject to asynchronous or synchronous replication from the source to the target. For example, one or more sets of storage volumes each comprising a plurality of storage volumes can be included in a given consistency group. It will be assumed for clarity and simplicity of the following description that at least one storage volume is subject to ongoing replication, but the techniques described can be extended in a straightforward manner to multiple identified storage volumes as well as multiple sets of storage volumes.

In step 202, the source obtains a set of hash handles based on results of the differential scan. For example, the set of hash handles can include hash handles for any data pages that are determined based on the differential scan to have been modified between the generation of the previous and current snapshots.

In step 204, the source issues a write for the set of hash handles to the target. This issued write is not an actual write, such as a write intended to write the hash handles to the target, but is instead a write to a designated "hash handles" address such that the target can recognize the issued write as a command to initiate a hash handle scan in the target against the set of hash handles provided by the source. The issued write is illustratively configured using a command structure of a standard storage command protocol, but it conveys an instruction to the target to trigger the hash handle scan. The hash handle for a given data page represents that data page and is determined based at least in part on content of that data page as described elsewhere herein. Such a hash handle is an example of what is more generally referred to herein as a "content-based signature" of the corresponding data page.

In step 206, the target checks the hash handles supplied by the source against hash handles of the target and populates a first bitmap with indications of whether or not a matching hash handle was found in the target. For example, the first bitmap can include a plurality of entries for respective ones of the hash handles supplied by the source, with each entry comprising a single success bit that is set by the target to a logic "1" value if the corresponding hash handle has been matched by the target. Other types of bitmaps or alternative data structures can be used in other embodiments.

In step 208, the source reads the first bitmap from a designated location on the target, illustratively using a read command in a standard storage command protocol. For any data pages for which the corresponding hash handles were successfully matched by the target, the source issues a write for the hash digests and logical addresses to the target. This write is not an actual write command, but is instead a write to a designated "hash digests" address such that the target can recognize the issued write as a command to perform certain functionality relating to the hash digests. The issued write is illustratively configured using a command structure of a standard storage command protocol, but it conveys an instruction to the target to trigger the performance of that functionality.

In step 210, the target responsive to the issued write checks the hash digests against its stored hash digests for the corresponding data pages, and populates a second bitmap to indicate for each of the hash digests provided by the source whether or not there is a matching hash digest on the target. The target also adjusts its address mapping and reference counts as necessary for the corresponding data pages.

In step 212, the source reads the second bitmap from another designated location on the target, again illustratively using a read command in a standard storage command protocol. For any data pages for which the corresponding hash digests were not successfully matched by the target, the source writes those non-matching data pages to the target at their corresponding logical addresses.

In step 214, the source receives confirmation from the target that differential update of the replicated storage volume is complete for the current cycle of the ongoing replication process.

In step 216, the ongoing replication process continues with a return to step 200 to perform another differential scan for the next cycle.

The FIG. 2 process implements an illustrative example of what is more generally referred to herein as deduplication-aware replication using standard storage command protocols. Other types of deduplication-aware replication can be used in other embodiments. For example, although this embodiment utilizes both hash handles and hash digests, other embodiments implemented in storage systems not supporting hash handles can be configured to operate using only hash digests, with the steps of the process being adjusted in a straightforward manner to eliminate any utilization of hash handles. Other embodiments using other types and arrangements of content-based signatures can also be implemented.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for deduplication-aware replication using standard storage command protocols. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different asynchronous or synchronous replication processes for respective different sets of one or more storage volumes or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, storage controllers such as storage controllers 108 of storage systems 102 that are configured to control performance of one or more steps of the FIG. 2 process in their corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controllers 108, as well as other system components, may be implemented at least in part using processing devices of such processing platforms. For example, in a distributed implementation of a given one of the storage controllers 108, respective distributed modules of such a storage controller can be implemented in respective containers running on respective ones of the processing devices of a processing platform.

The differential scan referred to in conjunction with step 200 of the FIG. 2 process is illustratively performed as part of a cycle-based asynchronous replication process based on differential scanning of snapshots.

It is assumed for the present embodiment that there is a previous snapshot set already available in the source storage system 102S. For example, the previous snapshot set may be available from a previous cycle of a cycle-based asynchronous replication process. In an initial asynchronous replication cycle, the entire content of the current snapshot set is illustratively transferred to from the source to the target, and differential scanning of the current snapshot set relative to the previous snapshot set is not utilized. The current snapshot set for the initial replication cycle becomes the previous snapshot set for the next replication cycle. A previous snapshot set can similarly be available in the context of an ongoing synchronous replication process.

The current snapshot set and other snapshot sets referred to in the context of some embodiments herein are illustratively generated for a consistency group that comprises multiple storage volumes. A snapshot tree of the consistency group in such embodiments illustratively comprises multiple individual snapshot trees for respective ones of the storage volumes, each generally having the same topology of nodes. Accordingly, generation of a snapshot set for a consistency group illustratively comprises generating a plurality of snapshots for respective ones of the multiple storage volumes. Such snapshot sets and associated versions of the consistency group vary over time and are represented by nodes of the snapshot tree of the consistency group. Again, the snapshot tree for the consistency group may be viewed as illustratively comprising multiple superimposed snapshot trees for the respective storage volumes of the consistency group with each such storage volume snapshot tree having substantially the same topology as the consistency group snapshot tree.

A given one of the snapshot trees corresponding to a particular one of the storage volumes more particularly comprises a root node, at least one branch node, and a plurality of leaf nodes, with a given one of the branch nodes representing a particular version of the storage volume from which a corresponding snapshot is taken. A first one of the leaf nodes which is a child of the given branch node represents a subsequent version of the storage volume, and a second one of the leaf nodes which is a child of the given branch node comprises the corresponding snapshot providing a point-in-time (PIT) copy of the particular version of the storage volume.

An illustrative example of a consistency group snapshot tree of the type described above is shown in FIG. 3, and will be described in greater detail below.

In some embodiments, the snapshot trees comprise or are otherwise associated with additional information also arranged in the form of a tree structure. For example, a given one of the snapshot trees may be associated with one or more additional trees including at least one of a "dirty" tree that characterizes updates to logical addresses of the corresponding storage volume, and a hash tree comprising content-based signatures of respective ones of the logical addresses of the corresponding storage volume. All nodes of a given snapshot tree in some embodiments, including both branch nodes and leaf nodes, may each be associated with corresponding metadata of both a dirty tree and a hash tree.

An instance of a differential scan in an asynchronous replication process performed for the given snapshot tree in embodiments of this type can further comprise aggregating information of at least one of the dirty tree and the hash tree between start and stop nodes of the given snapshot tree.

A wide variety of other types of snapshot trees and possibly one or more associated additional trees can be used in other embodiments. Also, the term "tree" as used herein is intended to be broadly construed so as to comprise any type of data structure characterizing a plurality of nodes and a plurality of edges interconnecting respective pairs of the nodes.

Figure 3:
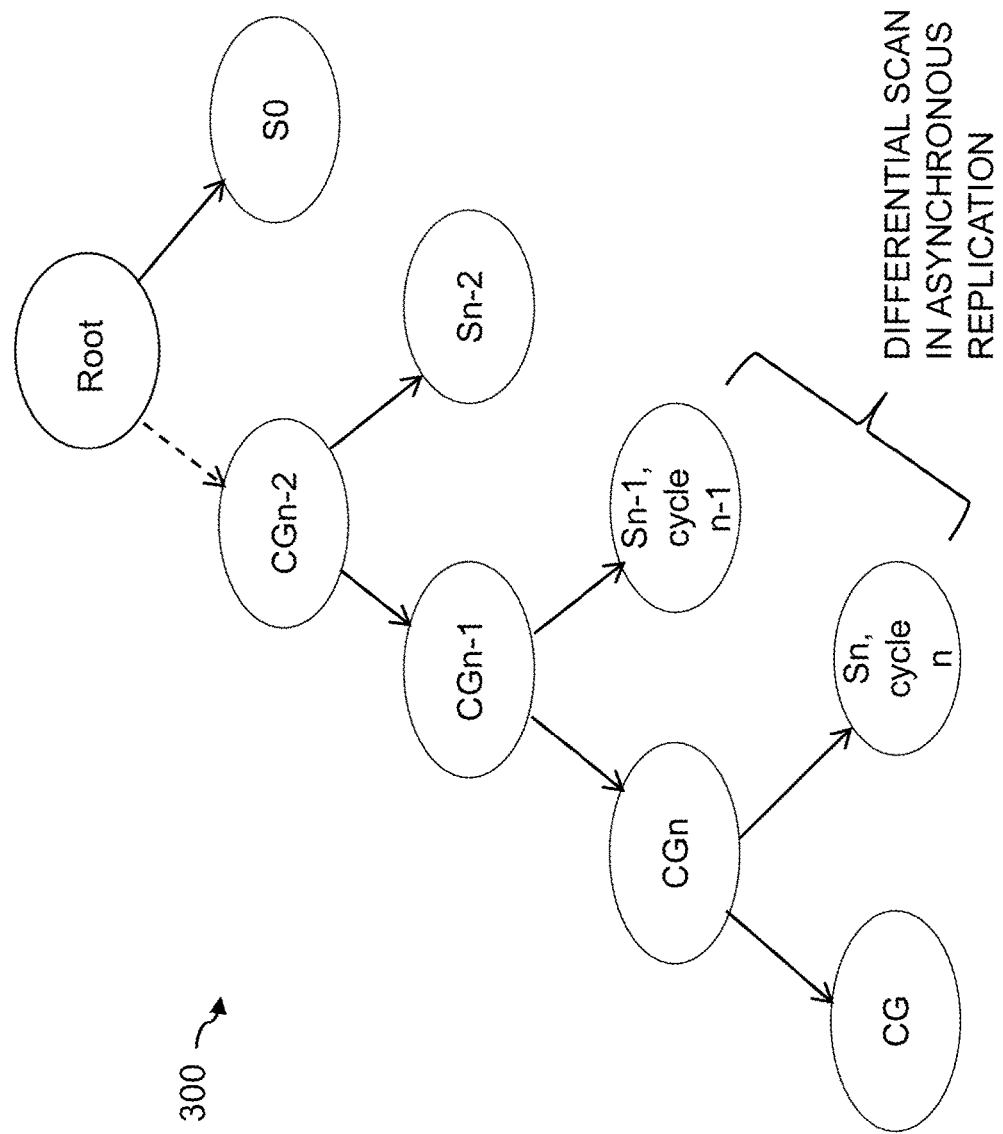
FIG. 3 shows an example of a snapshot tree utilized in conjunction with deduplication-aware replication in an illustrative embodiment.

FIG. 3 shows an example of a snapshot tree 300 for a consistency group comprising at least one storage volume that is subject to replication in the FIG. 2 process. It is assumed for this example that the replication process is an asynchronous replication process, although a similar snapshot tree configuration can be used in a synchronous replication process. Such a snapshot tree illustratively represents a combination of multiple superimposed snapshot trees for respective ones of the storage volumes of the consistency group, with each of the storage volume snapshot trees having substantially the same format as the snapshot tree 300. Thus, although the snapshot tree format illustrated in the figure is for a consistency group, it may also be viewed as being representative of multiple individual snapshot trees for respective storage volumes of the consistency group.

The snapshot tree 300 comprises a root node and a plurality of branch nodes denoted CGn-2, CGn-1, CGn and CG. The root node represents a version of the consistency group from which an initial PIT copy is captured as snapshot set S0. The branch nodes CGn-2, CGn-1 and CGn represent subsequent versions of the consistency group from which respective PIT copies are captured as subsequent snapshot sets Sn-2, Sn-1 and Sn, as the storage volumes of the consistency group change over time responsive to execution of IO operations. The snapshot sets Sn-1 and Sn are associated with respective previous and current asynchronous replication cycles denoted as cycle n-1 and cycle n.

A given storage volume snapshot tree having a format of the type shown in FIG. 3 represents a storage volume and its snapshots over time. Each leaf node represents a particular version of the storage volume or a snapshot of the storage volume, and each branch node represents a shared ancestor between a version of the storage volume, a snapshot of the storage volume, or a child branch node. When a given snapshot of the storage volume is created, two child leaf nodes are created, one representing new updates to the storage volume after creation of the snapshot, and the other representing the snapshot. The volume node from which the snapshot was created therefore becomes a branch node in the snapshot tree. When a given snap set of the consistency group is created for its member storage volumes, two new leaf nodes are created in each of the snapshot trees of the respective storage volumes.

The snapshot set Sn in this example is a type of current snapshot set, and the snapshot set Sn-1 is a type of previous snapshot set. An instance of differential scanning performed as part of the asynchronous replication process in this example utilizes as its start node the non-root node corresponding to the previous snapshot set Sn-1 of the previous replication cycle n-1 and utilizes as its stop node the non-root node corresponding to the current snapshot set Sn of the current replication cycle n. These start and stop nodes are associated with respective branch nodes CGn-1 and CGn. The branch nodes CGn-1 and CGn are representative of what are more generally referred to herein as respective first and second nodes corresponding to respective previous and current snapshot sets.

The differential scan illustratively involves aggregating node metadata between the start and stop nodes, such as dirty tree and hash tree metadata. It is to be appreciated that terms such as "aggregating" and "aggregate" as used herein are intended to be broadly construed, and can include multiple different types of aggregation, such as aggregation of dirty tree metadata followed by aggregation of hash tree metadata, with each such aggregation type possibly proceeding in different directions through at least portions of a given node chain and in some cases involving different node chains potentially having different sets of nodes.

Terms such as "root node," "non-root node," "start node" and "stop node" as used herein are all intended to be broadly construed. A non-root node is considered to be any snapshot tree node that is not a root node. Start node and stop node designations for a given snapshot tree in some embodiments can be reversed relative to the designation arrangements referred to above in conjunction with the example of FIG. 3. Accordingly, such terms should not be construed as requiring a particularly directionality for scanning the snapshot tree. It should also be understood that a wide variety of other snapshot tree arrangements may be used.

The FIG. 2 process also makes use of various metadata structures that are maintained within the source and target storage systems. Examples of metadata structures maintained by the source and target storage systems in illustrative embodiments include the logical layer and physical layer mapping tables shown in respective FIGS. 4A, 4B, 4C and 4D. It is to be appreciated that these particular tables are only examples, and other tables or metadata structures having different configurations of entries and fields can be used in other embodiments.

Referring initially to FIG. 4A, an address-to-hash ("A2H") table 400 is shown. The A2H table 400 comprises a plurality of entries accessible utilizing logical addresses denoted Logical Address 1, Logical Address 2, . . . Logical Address M as respective keys, with each such entry of the A2H table 400 comprising a corresponding one of the logical addresses, a corresponding one of the hash handles, and possibly one or more additional fields.

Figure 4B:
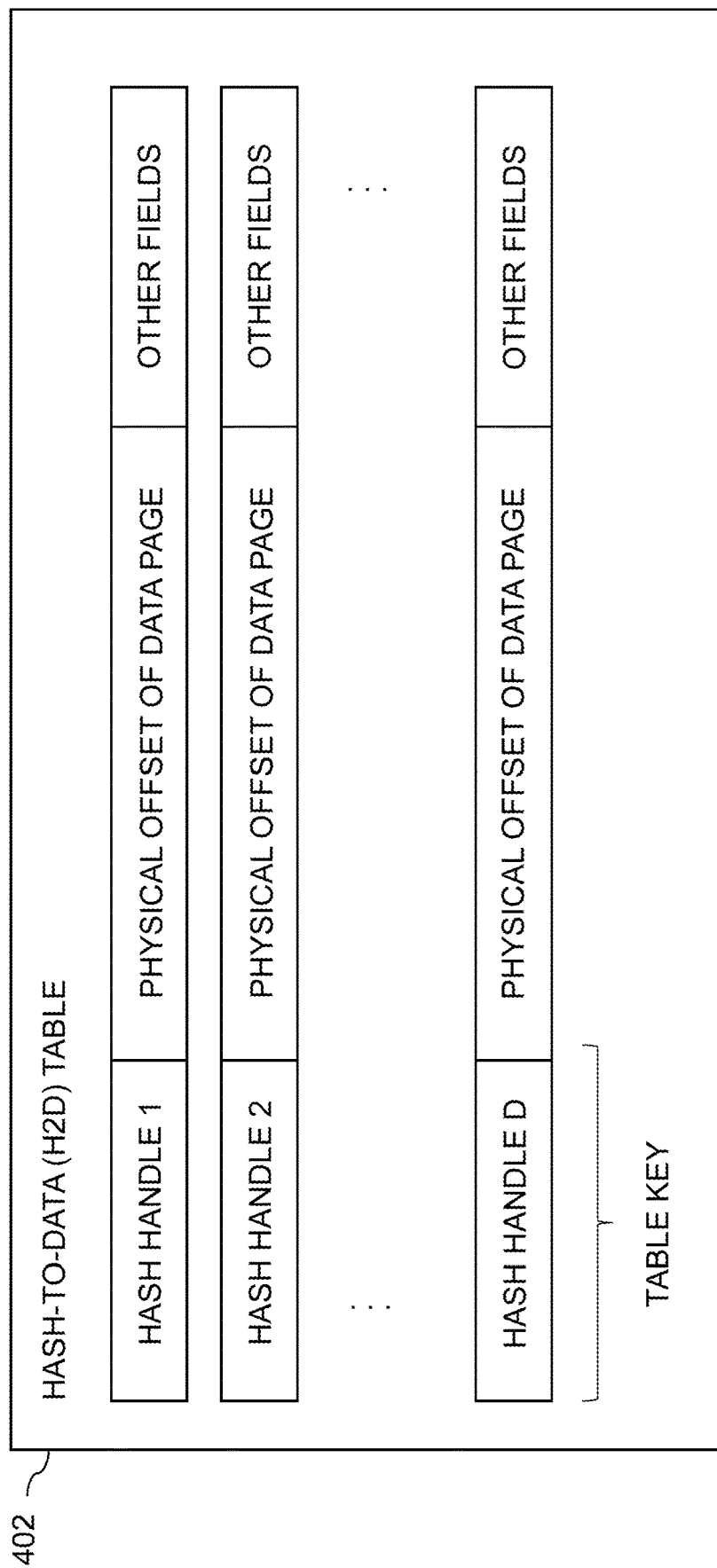

FIG. 4B shows a hash-to-data ("H2D") table 402 that illustratively comprises a plurality of entries accessible utilizing hash handles denoted Hash Handle 1, Hash Handle 2, . . . Hash Handle D as respective keys, with each such entry of the H2D table 402 comprising a corresponding one of the hash handles, a physical offset of a corresponding one of the data pages, and possibly one or more additional fields.

Referring now to FIG. 4C, a hash metadata ("HMD") table 404 comprises a plurality of entries accessible utilizing hash handles denoted Hash Handle 1, Hash Handle 2, . . . Hash Handle H as respective keys. Each such entry of the HMD table 404 comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. Although not explicitly so indicated in the figure, the HMD table 404 may also include one or more additional fields.

In the present embodiment, the HMD table of FIG. 4C illustratively comprises at least a portion of the same information that is found in the H2D table of FIG. 4B. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

FIG. 4D shows a physical layer based ("PLB") table 406 that illustratively comprises a plurality of entries accessible utilizing physical offsets denoted Physical Offset 1, Physical Offset 2, . . . Physical Offset P as respective keys, with each such entry of the PLB table 406 comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Also, it is to be appreciated that terms such as "table" and "entry" as used herein are intended to be broadly construed, and the particular example table and entry arrangements of FIGS. 4A through 4D can be varied in other embodiments. For example, additional or alternative arrangements of entries can be used.

In some embodiments, the storage system comprises an XtremIO™ storage array or other type of content addressable storage system suitably modified to incorporate deduplication-aware replication functionality as disclosed herein.

An illustrative embodiment of such a content addressable storage system will now be described with reference to FIG. 5. In this embodiment, a content addressable storage system 505 comprises a plurality of storage devices 506 and an associated storage controller 508. The content addressable storage system 505 may be viewed as a particular implementation of a given one of the storage systems 102, and accordingly is assumed to be coupled to the other one of the storage systems 102 and to one or more host devices of a computer system within information processing system 100.

Although it is assumed that both the source storage system 102S and the target storage system 102T are content addressable storage systems in some embodiments, other types of storage systems can be used for one or both of the source storage system 102S and the target storage system 102T in other embodiments. For example, it is possible that at least one of the storage systems 102 in an illustrative embodiment need not be a content addressable storage system and need not include an ability to generate content-based signatures. In such an embodiment, the signature generator and other parts of the deduplication-aware replication functionality of the one or more storage systems can be implemented in a host device.

The storage controller 508 in the present embodiment is configured to implement deduplication-aware replication functionality of the type previously described in conjunction with FIGS. 1 through 4. For example, the content addressable storage system 505 illustratively participates as a source storage system in an asynchronous or synchronous replication process with a target storage system that may be implemented as another instance of the content addressable storage system 505.

The storage controller 508 includes distributed modules 512 and 514, which are configured to operate in a manner similar to that described above for respective corresponding replication control logic 112 and signature generators 114 of the storage controllers 108 of system 100. Module 512 is more particularly referred to as distributed replication control logic, and illustratively comprises multiple replication control logic instances on respective ones of a plurality of distinct nodes, with the multiple replication control logic instances comprising at least a portion of a replication engine configured to perform process operations such as those described in conjunction with FIG. 2. Module 514 is more particularly referred to as a distributed signature generator, and illustratively comprises multiple signature generation instances on respective ones of the distinct nodes.

Figure 5:
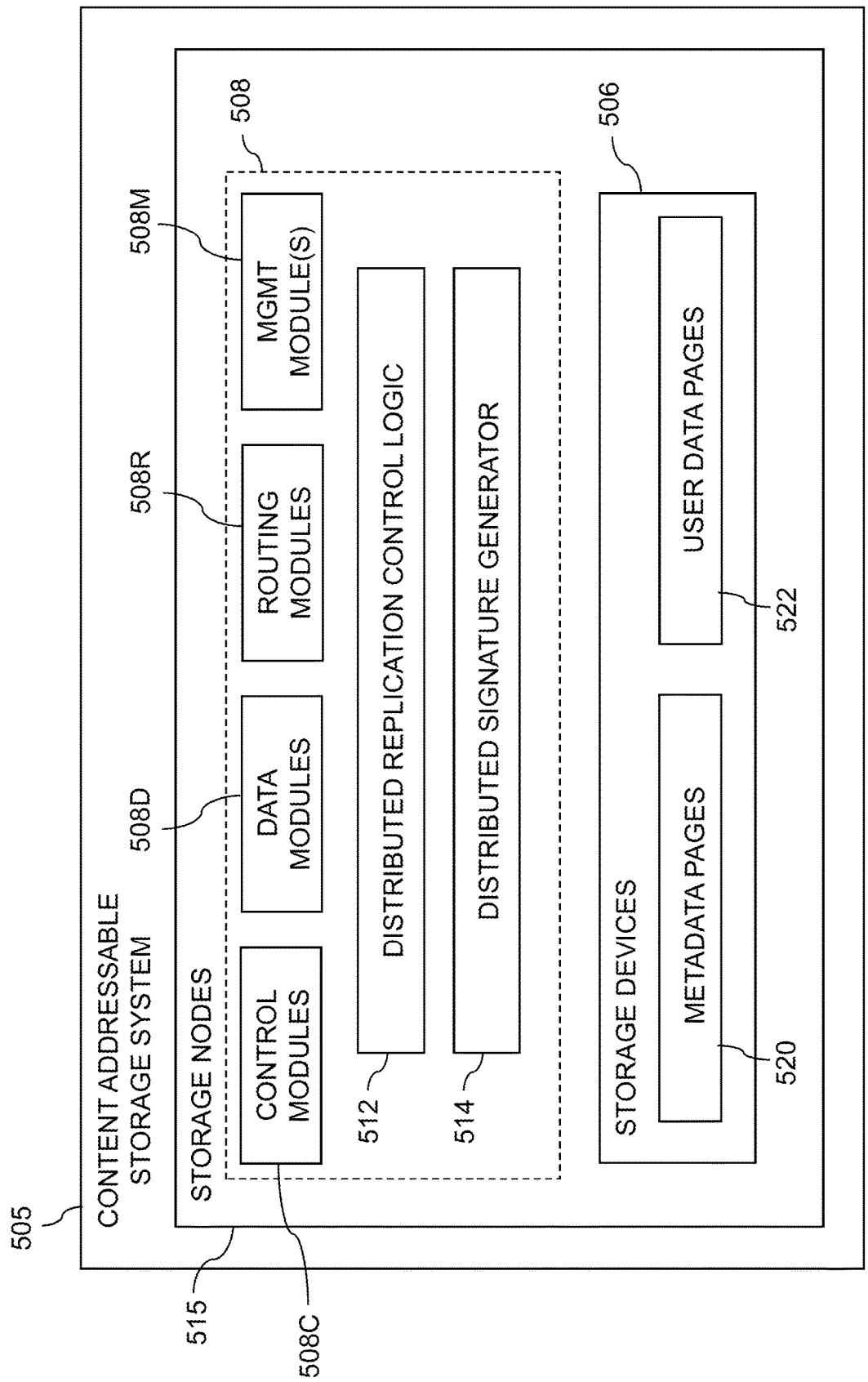
FIG. 5 shows a content addressable storage system having a distributed storage controller configured with deduplication-aware replication functionality in an illustrative embodiment.

The content addressable storage system 505 in the FIG. 5 embodiment is implemented as at least a portion of a clustered storage system and includes a plurality of storage nodes 515 each comprising a corresponding subset of the storage devices 506. Such storage nodes 515 are examples of the "distinct nodes" referred to above, and other clustered storage system arrangements comprising multiple storage nodes and possibly additional or alternative nodes can be used in other embodiments. A given clustered storage system may therefore include not only storage nodes 515 but also additional storage nodes, compute nodes or other types of nodes coupled to network 104. Alternatively, such additional storage nodes may be part of another clustered storage system of the system 100. Each of the storage nodes 515 of the storage system 505 is assumed to be implemented using at least one processing device comprising a processor coupled to a memory.

The storage controller 508 of the content addressable storage system 505 is implemented in a distributed manner so as to comprise a plurality of distributed storage controller components implemented on respective ones of the storage nodes 515. The storage controller 508 is therefore an example of what is more generally referred to herein as a "distributed storage controller." In subsequent description herein, the storage controller 508 is referred to as distributed storage controller 508.

Each of the storage nodes 515 in this embodiment further comprises a set of processing modules configured to communicate over one or more networks with corresponding sets of processing modules on other ones of the storage nodes 515. The sets of processing modules of the storage nodes 515 collectively comprise at least a portion of the distributed storage controller 508 of the content addressable storage system 505.

The modules of the distributed storage controller 508 in the present embodiment more particularly comprise different sets of processing modules implemented on each of the storage nodes 515. The set of processing modules of each of the storage nodes 515 comprises at least a control module 508C, a data module 508D and a routing module 508R. The distributed storage controller 508 further comprises one or more management ("MGMT") modules 508M. For example, only a single one of the storage nodes 515 may include a management module 508M. It is also possible that management modules 508M may be implemented on each of at least a subset of the storage nodes 515. A given set of processing modules implemented on a particular one of the storage nodes 515 therefore illustratively includes at least one control module 508C, at least one data module 508D and at least one routing module 508R, and possibly a management module 508M.

Communication links may be established between the various processing modules of the distributed storage controller 508 using well-known communication protocols such as IP, Transmission Control Protocol (TCP), and remote direct memory access (RDMA). For example, respective sets of IP links used in data transfer and corresponding messaging could be associated with respective different ones of the routing modules 508R.

Although shown as separate modules of the distributed storage controller 508, the modules 512 and 514 in the present embodiment are assumed to be distributed at least in part over at least a subset of the other modules 508C, 508D, 508R and 508M of the storage controller 508. Accordingly, at least portions of the deduplication-aware replication functionality of the modules 512 and 514 may be implemented in one or more of the other modules of the storage controller 508. In other embodiments, the modules 512 and 514 may be implemented as stand-alone modules of the storage controller 508.

The storage devices 506 are configured to store metadata pages 520 and user data pages 522, and may also store additional information not explicitly shown such as checkpoints and write journals. The metadata pages 520 and the user data pages 522 are illustratively stored in respective designated metadata and user data areas of the storage devices 506. Accordingly, metadata pages 520 and user data pages 522 may be viewed as corresponding to respective designated metadata and user data areas of the storage devices 506.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 520 and the user data pages 522.

The user data pages 522 are part of a plurality of LUNs configured to store files, blocks, objects or other arrangements of data, each also generally referred to herein as a "data item," on behalf of users of the content addressable storage system 505. Each such LUN may comprise particular ones of the above-noted pages of the user data area. The user data stored in the user data pages 522 can include any type of user data that may be utilized in the system 100. The term "user data" herein is therefore also intended to be broadly construed.

A given storage volume for which content-based signatures are generated using modules 512 and 514 illustratively comprises a set of one or more LUNs, each including multiple ones of the user data pages 522 stored in storage devices 506.

The content addressable storage system 505 in the embodiment of FIG. 5 is configured to generate hash metadata providing a mapping between content-based digests of respective ones of the user data pages 522 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 522. The hash metadata generated by the content addressable storage system 505 is illustratively stored as metadata pages 520 in the metadata area. The generation and storage of the hash metadata is assumed to be performed under the control of the storage controller 508.

Each of the metadata pages 520 characterizes a plurality of the user data pages 522. For example, a given set of user data pages representing a portion of the user data pages 522 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 506.

Each of the metadata pages 520 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 520 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 505 is illustratively distributed among the control modules 508C.

The deduplication-aware replication functionality provided by modules 512 and 514 in this embodiment is assumed to be distributed across multiple distributed processing modules, including at least a subset of the processing modules 508C, 508D, 508R and 508M of the distributed storage controller 508.

For example, the management module 508M of the storage controller 508 may include a replication control logic instance that engages corresponding replication control logic instances in all of the control modules 508C and routing modules 508R in order to implement an asynchronous or synchronous replication process.

In some embodiments, the content addressable storage system 505 comprises an XtremIO™ storage array suitably modified to incorporate deduplication-aware replication functionality as disclosed herein.

In arrangements of this type, the control modules 508C, data modules 508D and routing modules 508R of the distributed storage controller 508 illustratively comprise respective C-modules, D-modules and R-modules of the XtremIO™ storage array. The one or more management modules 508M of the distributed storage controller 508 in such arrangements illustratively comprise a system-wide management module ("SYM module") of the XtremIO™ storage array, although other types and arrangements of system-wide management modules can be used in other embodiments. Accordingly, deduplication-aware replication functionality in some embodiments is implemented under the control of at least one system-wide management module of the distributed storage controller 508, utilizing the C-modules, D-modules and R-modules of the XtremIO™ storage array.

In the above-described XtremIO™ storage array example, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 508C such that control of the slices within the storage controller 508 of the storage system 505 is substantially evenly distributed over the control modules 508C of the storage controller 508.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 505 each illustratively comprise one or more IO operations directing that at least one data item of the storage system 505 be written to in a particular manner. A given write request is illustratively received in the storage system 505 from a host device over a network. In some embodiments, a write request is received in the distributed storage controller 508 of the storage system 505, and directed from one processing module to another processing module of the distributed storage controller 508. For example, a received write request may be directed from a routing module 508R of the distributed storage controller 508 to a particular control module 508C of the distributed storage controller 508. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 515 communicate with one another over a high-speed internal network such as an InfiniBand network. The C-modules, D-modules and R-modules coordinate with one another to accomplish various IO processing tasks.

The write requests from the host devices identify particular data pages to be written in the storage system 505 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 505 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the content addressable storage system 505. The HMD table or a given portion thereof in some embodiments disclosed herein is more particularly referred to as a hash-to-data ("H2D") table.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106. This is also referred to as physical layer mapping.

Examples of these and other metadata structures utilized in illustrative embodiments were described above in conjunction with FIGS. 4A through 4D. These particular examples include respective A2H, H2D, HMD and PLB tables. In some embodiments, the A2H and H2D tables are utilized primarily by the control modules 508C, while the HMD and PLB tables are utilized primarily by the data modules 508D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the content addressable storage system 505. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the storage system 505 correspond to respective physical blocks of a physical layer of the storage system 505. The user data pages of the logical layer are organized by LBA and have reference via respective content-based signatures to particular physical blocks of the physical layer.

Each of the physical blocks has an associated reference count that is maintained within the storage system 505. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 508C, 508D, 508R and 508M as shown in the FIG. 5 embodiment is presented by way of example only. Numerous alternative arrangements of processing modules of a distributed storage controller may be used to implement deduplication-aware replication functionality in a clustered storage system in other embodiments.

Additional examples of content addressable storage functionality implemented in some embodiments by control modules 508C, data modules 508D, routing modules 508R and management module(s) 508M of distributed storage controller 508 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of a storage system with deduplication-aware replication functionality as disclosed herein can provide a number of significant advantages relative to conventional arrangements.

For example, some of these embodiments advantageously provide deduplication-aware replication functionality using standard storage command protocols. Such embodiments advantageously avoid the need for utilization of proprietary protocols between the source and target storage systems, and therefore allow such replication to be carried out in a much wider variety of storage systems than would otherwise be possible.

In addition, illustrative embodiments facilitate the achievement of a desired RPO in an information processing system.

These and other embodiments illustratively provide deduplication-aware replication of one or more storage volumes from a source storage system to a target storage system in a manner that is bandwidth efficient.

More particularly, illustrative embodiments disclosed herein can considerably reduce the amount of network bandwidth that is consumed in replication, thereby leading to improved storage system performance.

In some embodiments, the source and target storage systems are illustratively implemented as respective content addressable storage systems, but in other embodiments one or more of the storage systems can instead be a traditional storage array, which does not support any type of content addressable storage functionality, and possibly does not even include any ability to generate hash digests, hash handles or other content-based signatures. For example, in embodiments in which at least one of the source storage system and the target storage system is unable to generate hash digests, hash handles or other content-based signatures, that functionality can be provided by a host device.

Accordingly, functionality for deduplication-aware replication as disclosed herein can be implemented in at least one storage system, in at least one host device, or partially in one or more storage systems and partially in one or more host devices.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with deduplication-aware replication functionality will now be described in greater detail with reference to FIGS. 6 and 7. Although described in the context of system 100, these platforms may also be used to implement at least portions of other information processing systems in other embodiments.

Figure 6:
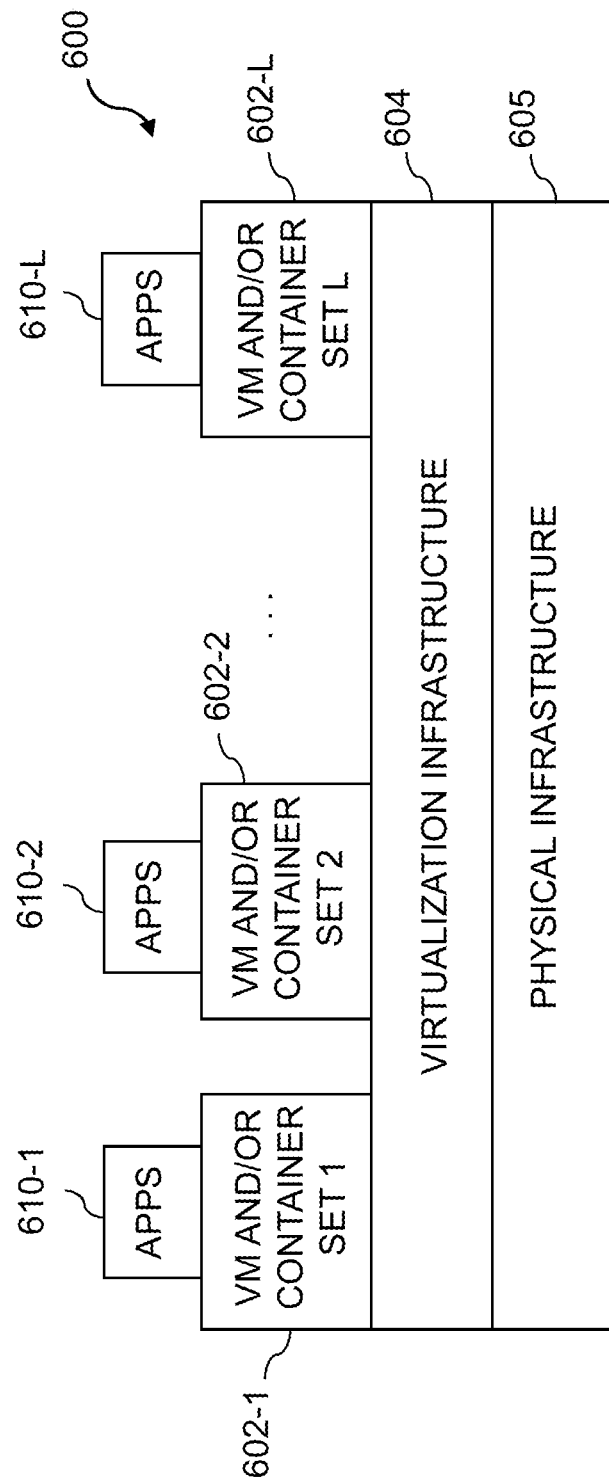
FIGS. 6 and 7 show examples of processing platforms that may be utilized to implement at least a portion of an information processing system in illustrative embodiments.
Figure 7:
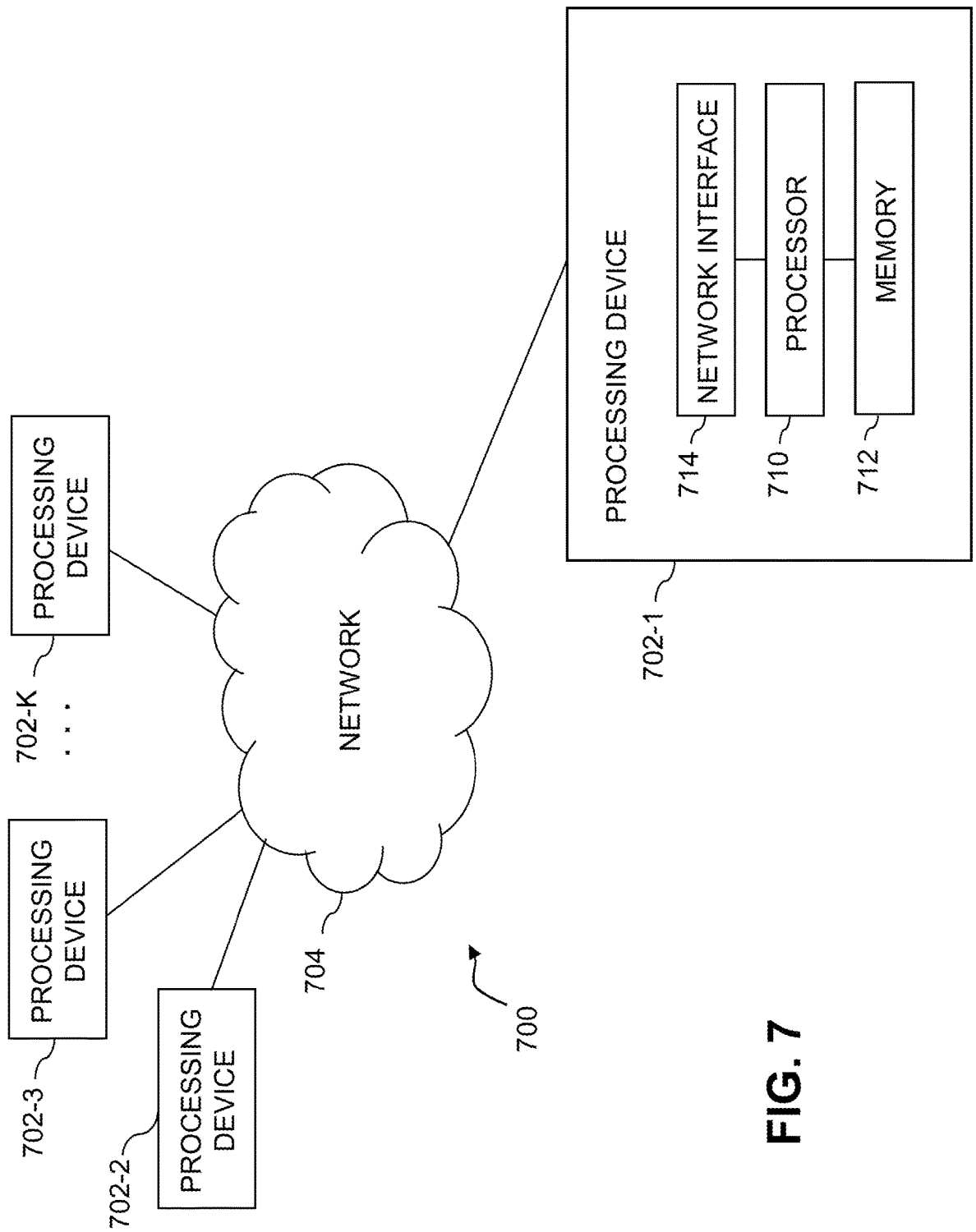

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide deduplication-aware replication functionality of the type described above for one or more processes running on a given one of the VMs. For example, each of the VMs can implement replication control logic and/or signature generators for supporting deduplication-aware replication functionality in the system 100.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide deduplication-aware replication functionality of the type described above. For example, a container host device supporting multiple containers of one or more container sets can implement one or more instances of replication control logic and/or signature generators for supporting deduplication-aware replication functionality in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the deduplication-aware replication functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, asynchronous or synchronous replication processes, signature generators and associated control logic and metadata structures. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   to obtain a set of content-based signatures for respective data pages of at least a portion of at least one storage volume replicated from a source storage system to a target storage system;
   to issue a write for the set of content-based signatures to the target storage system;
   to read from a designated location in the target storage system information indicating for each of the content-based signatures whether or not the corresponding data page is present in the target storage system; and
   for one or more data pages not present in the target storage system, to write the one or more data pages to respective logical addresses of the replicated storage volume in the target storage system;
   wherein issuing a write for the set of content-based signatures to the target storage system comprises:
   generating a write command; and
   sending the write command to the target storage system;
   wherein the write command is issued to a designated content-based signature scan address; and
   wherein the write command issued to the designated content-based signature scan address is interpreted by the target storage system as not comprising an actual write command but instead comprising a command to scan for content-based signatures.

2. The apparatus of claim 1 wherein said at least one processing device is implemented at least in part within at least one of the source and target storage systems.

3. The apparatus of claim 2 wherein said at least one processing device comprises a storage controller of at least one of the source storage system and the target storage system.

4. The apparatus of claim 1 wherein the replicated storage volume comprises at least one logical storage volume that is part of a consistency group subject to an ongoing replication process carried out between the source and target storage systems.

5. The apparatus of claim 1 wherein obtaining the set of content-based signatures comprises:
   generating a current snapshot of the replicated storage volume;
   performing a differential scan of the current snapshot relative to a previous snapshot of the replicated storage volume; and
   obtaining the set of content-based signatures based at least in part on results of the differential scan.

6. The apparatus of claim 1 wherein issuing a write to the target storage system, reading from the designated location, and writing the one or more data pages to respective logical addresses are performed utilizing respective commands of a standard storage command protocol.

7. The apparatus of claim 6 wherein the standard storage command protocol comprises a Small Computer System Interface (SCSI) protocol.

8. The apparatus of claim 6 wherein the standard storage command protocol comprises a non-volatile memory over fabric protocol.

9. The apparatus of claim 1 wherein the information indicating for each of the content-based signatures whether or not the corresponding data page is present in the target storage system comprises at least one bitmap.

10. The apparatus of claim 1 wherein the content-based signatures comprise respective hash digests of respective data pages of the replicated storage volume with a given one of the hash digests being generated by applying a secure hashing algorithm to content of a corresponding one of the data pages of the replicated storage volume.

11. The apparatus of claim 1 wherein the content-based signatures comprise respective hash handles of respective ones of the data pages.

12. The apparatus of claim 11 wherein said at least one processing device is further configured:
   for any of the data pages which are determined based on the hash handles to be present in the target storage system, to issue a write for hash digests and respective logical addresses of those data pages in the replicated storage volume to the target storage system; and
   to read from another designated location in the target storage system information indicating for each of the hash digests whether or not a matching data page is present in the target storage system;

wherein the target storage system adjusts logical address mapping information and increments a reference count for each of one or more of the matching data pages; and wherein the source storage system writes one or more non-matching data pages to respective logical addresses of the replicated storage volume in the target storage system.

13. The apparatus of claim 1 wherein for at least one of the one or more data pages not present in the target storage system, the source storage system writes the data page to a corresponding logical address in a compressed format, and the data page in the compressed format is decompressed by the target storage system prior to its storage in the corresponding logical address.

14. A method comprising:
    obtaining a set of content-based signatures for respective data pages of at least a portion of at least one storage volume replicated from a source storage system to a target storage system;
    issuing a write for the set of content-based signatures to the target storage system;
    reading from a designated location in the target storage system information indicating for each of the content-based signatures whether or not the corresponding data page is present in the target storage system; and
    for one or more data pages not present in the target storage system, writing the one or more data pages to respective logical addresses of the replicated storage volume in the target storage system;
    wherein issuing a write for the set of content-based signatures to the target storage system comprises:
    generating a write command; and
    sending the write command to the target storage system;
    wherein the write command is issued to a designated content-based signature scan address;
    wherein the write command issued to the designated content-based signature scan address is interpreted by the target storage system as not comprising an actual write command but instead comprising a command to scan for content-based signatures; and
    wherein the method is implemented by at least one processing device comprising a processor coupled to a memory.

15. The method of claim 14 wherein issuing a write to the target storage system, reading from the designated location, and writing the one or more data pages to respective logical addresses are performed utilizing respective commands of a standard storage command protocol.

16. A computer program product comprising a non-transitory processor-readable storage medium having stored therein program code of one or more software programs, wherein the program code when executed by at least one processing device causes said at least one processing device:
    to obtain a set of content-based signatures for respective data pages of at least a portion of at least one storage volume replicated from a source storage system to a target storage system;
    issuing a write for the set of content-based signatures to the target storage system;
    to read from a designated location in the target storage system information indicating for each of the content-based signatures whether or not the corresponding data page is present in the target storage system; and
    for one or more data pages not present in the target storage system, to write the one or more data pages to respective logical addresses of the replicated storage volume in the target storage system;
    wherein issuing a write for the set of content-based signatures to the target storage system comprises:
    generating a write command; and
    sending the write command to the target storage system;
    wherein the write command is issued to a designated content-based signature scan address; and
    wherein the write command issued to the designated content-based signature scan address is interpreted by the target storage system as not comprising an actual write command but instead comprising a command to scan for content-based signatures.

17. The computer program product of claim 16 wherein issuing a write to the target storage system, reading from the designated location, and writing the one or more data pages to respective logical addresses are performed utilizing respective commands of a standard storage command protocol.

18. The computer program product of claim 16 wherein the information indicating for each of the content-based signatures whether or not the corresponding data page is present in the target storage system comprises at least one bitmap.

19. The computer program product of claim 16 wherein the content-based signatures comprise respective hash digests of respective data pages of the replicated storage volume with a given one of the hash digests being generated by applying a secure hashing algorithm to content of a corresponding one of the data pages of the replicated storage volume.

20. The computer program product of claim 16 wherein the content-based signatures comprise respective hash handles of respective ones of the data pages.

* * * * *